(12) United States Patent
Jacobson

(10) Patent No.: US 9,303,537 B2
(45) Date of Patent: *Apr. 5, 2016

(54) OIL TANK BREATHER LINE SOLENOID VALVE

(76) Inventor: William Jacobson, Burlington, WA (US)

( * ) Notice: Subject to any disclaimer, the term of this patent is extended or adjusted under 35 U.S.C. 154(b) by 650 days.

This patent is subject to a terminal disclaimer.

(21) Appl. No.: 13/550,375

(22) Filed: Jul. 16, 2012

(65) Prior Publication Data

US 2012/0292545 A1    Nov. 22, 2012

Related U.S. Application Data

(63) Continuation-in-part of application No. 12/829,086, filed on Jul. 1, 2010, now Pat. No. 8,225,766.

(60) Provisional application No. 61/246,347, filed on Sep. 28, 2009.

(51) Int. Cl.

| F02B 77/08 | (2006.01) |
| F01M 11/00 | (2006.01) |
| F01M 1/02 | (2006.01) |
| F01M 13/00 | (2006.01) |
| F16N 19/00 | (2006.01) |
| F01M 11/06 | (2006.01) |
| F01M 1/12 | (2006.01) |

(52) U.S. Cl.
CPC .............. *F01M 11/0004* (2013.01); *F01M 1/02* (2013.01); *F01M 13/00* (2013.01); *F02B 77/08* (2013.01); *F16N 19/00* (2013.01); *F01M 11/065* (2013.01); *F01M 2001/126* (2013.01); *F01M 2011/0083* (2013.01); *F01M 2013/0022* (2013.01)

(58) Field of Classification Search
CPC ..... F01M 11/0004; F01M 1/02; F01M 13/00; F01M 2001/126; F01M 2011/0083; F01M 2013/0022; F01M 11/065; F16N 19/00; F02B 77/08
USPC ................. 123/196 R, 196 S, 196 CP, 198 D; 184/6.4; 180/313
See application file for complete search history.

(56) References Cited

U.S. PATENT DOCUMENTS

| 3,760,898 | A | * | 9/1973 | Kendall | .......................... 180/287 |
| 3,938,613 | A | | 2/1976 | Raborn | |
| 4,020,818 | A | * | 5/1977 | Lesnick et al. | ......... 123/198 DB |
| 4,762,968 | A | | 8/1988 | Hilton | |
| 4,912,338 | A | | 3/1990 | Bingham | |
| 5,167,550 | A | * | 12/1992 | Nielsen | ................. B63B 35/815 114/253 |
| 5,301,644 | A | * | 4/1994 | Olmr | ...................... 123/198 DB |
| 6,626,140 | B2 | | 9/2003 | Aichinger et al. | |
| 2001/0039908 | A1 | * | 11/2001 | Bilek | ....................... F01B 1/12 114/55.5 |
| 2004/0244832 | A1 | | 12/2004 | Sonnlietner et al. | |

* cited by examiner

*Primary Examiner* — Hung Q Nguyen
(74) *Attorney, Agent, or Firm* — Dwayne E. Rogge; Schacht Law Office, Inc.

(57) ABSTRACT

Disclosed herein is a device which provides a safety measure to vehicles by utilizing the dead man (tether) switch, or other electrical connection, in combination with a valve and actuator, to keep oil from leaking out of the lubrication system of the vehicle in a rollover situation.

17 Claims, 5 Drawing Sheets

OIL TANK BREATHER LINE SOLENOID VALVE

RELATED APPLICATIONS

This application claims priority benefit of and is a continuation in part of U.S. patent application Ser. No. 12/829,086 filed on Jul. 1, 2010 incorporated herein by reference. This application also claims priority to U.S. provisional application Ser. No. 61/246,347, filed Sep. 28, 2009 also incorporated herein by reference.

BACKGROUND OF THE DISCLOSURE a) Field of the Disclosure

Disclosed herein is the description of an improved rollover oil valve assembly and method for retrofitting vehicles with said rollover oil valve assembly. For examples, the vehicle may be a snowmobile, a four-wheel ATV or a similar off-road vehicle.

SUMMARY OF THE DISCLOSURE

Tethered dead man switches, such as disclosed in U.S. Pat. No. 3,938,613 (incorporated herein by reference), are well known in the art of off-road vehicles. These switches generally utilize a tether, coupled between a vehicle operator and a vehicle ignition system. When the vehicle operator is removed from the vehicle, the tether switch is opened and the ignition system of the vehicle is shut off. This has shown to be a significant safety measure, as the vehicle would otherwise continue to run, potentially damaging itself, or injuring the operator, or others. As is well known in the art, it can be very dangerous to the user, or damaging to the vehicle, if the vehicle is allowed to continue forward without an operator controlling the speed and direction of the vehicle. This is especially problematic in many types of watercraft, three or four wheel ATV's, and snowmobiles, which can very easily continue forward in a straight line on their own for a long period of time.

Disclosed herein is a device which provides an additional safety measure by utilizing in one form the dead man (tether) or kill switch, switch previously described, in combination with a valve and actuator, to keep oil from leaking out of the lubrication system of the vehicle in a rollover situation. Many prior art dead man switches, tethered or otherwise, operated by opening the switch, and "shutting off" power to the ignition system of the vehicle, but had no provision for containing fluids within the engine, fuel, or lubrication systems.

An additional problem is often caused in off-road vehicular accidents due to the arrangement of the engine oil tank relative to the engine air intake or other oil lines leading to or from the engine oil tank. Often, the engine oil tank is vented or otherwise fluidly coupled in such a way that when the vehicle is in an overturned orientation, the engine oil within the engine oil tank drains out of the engine oil tank. The oil is not recoverable when the vehicle is returned to an upright position.

Disclosed herein is a method and apparatus for utilizing a dead man switch in combination with a valve, arranged such that when the tether switch is activated, an signal is sent to the valve to close said valve. In one form, the signal closes the valve so that oil is prohibited from running past the valve and being lost to the environment, causing damage to environment, and potentially damaging the engine when the engine is re-started.

DESCRIPTION OF THE PREFERRED EMBODIMENTS

Figure 1:
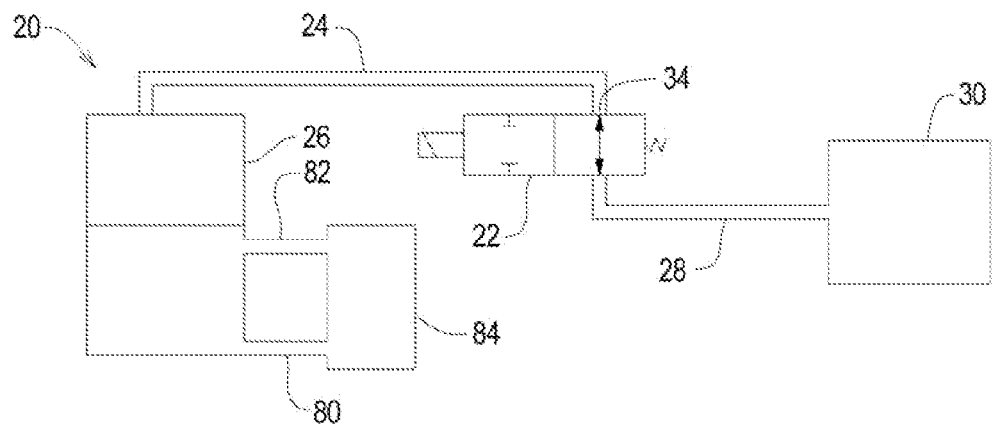
FIG. 1 is a schematic diagram of the fluid connections between an engine oil tank and a vent, such as an engine air intake, in one form.

FIG. 1 is a schematic diagram of an oil shutoff system 20 in one form, comprising an electric solenoid control valve 22, which is fluidly coupled to a connecting hose 24 running to an engine oil tank 26. While other valve types could be utilized, including pneumatic, spring, hydraulic, non-solenoid electric, or others, the primary disclosed embodiment will describe an electric solenoid control actuator in mechanical communication with the valve 22. A supply line 80 and return line 82 are fluidly connected between the oil tank 26 and the engine 84. The electric solenoid control valve 22 may be coupled to a connecting hose 28, fluidly coupled between the valve 22 and a vent 30, engine block, or, in one embodiment, an engine air intake 30. In one form, it is often found that venting the engine oil tank 26 through the engine air intake provides significant advantages including that the air intake filters air to the engine oil, and also allows blow-by gasses to vent to atmosphere without building up pressure in the oil tank 26.

Two different lubrication systems are common in internal combustion engines; dry sump and wet sump. Four stroke engines commonly used in snowmobiles, ATVs, motorcycles, race engines, aircraft, etc. often use dry sump oiling systems which have several advantages over wet sump systems. In a dry sump system, the oil supply is stored in a tank, thus oil capacity is increased relative to wet sump systems. A shallow oil pan can be used in such dry sump systems to allow the engine to sit very low in the chassis, and, because the oil supply is at the bottom of the tank, oil supply is improved in rough terrain use. Dry sump systems use two or more oil pumps. A supply pump provides pressurized oil to lubricate internal engine parts and a scavenge or return pump is utilized to remove the oil from the bottom of the engine and send it back to the tank. The two pumps can be incorporated into one pump unit having separate input ports and output ports for the supply and return oil lines. Such a pump unit would typically have two portions, these being a supply portion and a return portion. Because the rate of oil return can be different than the rate of supply, the oil tank is normally vented to as previously discussed, to prevent tank pressure buildup (or vacuum). Tank pressure buildup can cause poor oil scavenging performance and could lead to oil system failure. Some factors that can change the supply to scavenge rate are rapid RPM changes and compression gases leaking past the piston rings, often referred to as blow by gases. These blow by gases increase crankcase pressure, which can increase the scavenge pump flow rate. The change in flow rate can in some instances raise or lower the oil level in the tank, which can create undesirable tank pressure if not vented correctly.

Figure 2:
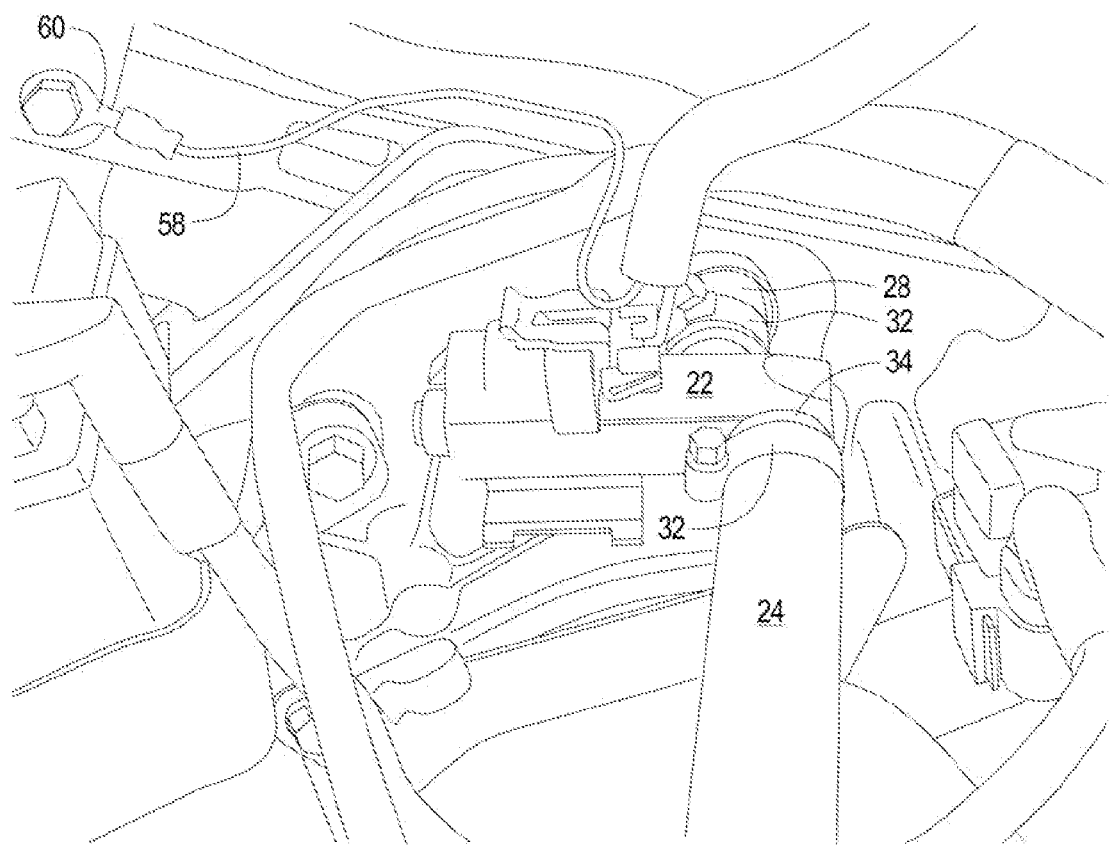
FIG. 2 is a drawing of an installed oil line solenoid valve, in one form.

Looking to FIG. 2, one embodiment of the electric solenoid control valve 22 is shown coupled to the connecting hose 28 and further coupled to the engine air intake or other assembly. As shown in this embodiment, a plurality of hose clamps 32 can be utilized on the input side and outlet side of the solenoid valve 22 to ensure a pressure-retaining seal between the connecting hoses 24/28 and the solenoid 22. The input side 34 of the oil line solenoid 22 in this example is coupled to the connecting hose 24, which delivers tank vapors to the oil line solenoid 22 from the engine oil tank 26 in normal operating conditions. As previously mentioned, the tether switch is activated when the tether (normally attached to the user/driver) is removed from the vehicle, such that the tether switch is actuated and power is cut from the engine, shutting off the engine. Concurrently, in one form, power is supplied to a normally open oil line solenoid 22, shutting the valve. While it may be alternately possible or desired to incorporate a normally closed oil line solenoid valve 22, having a normally closed valve may result in less than satisfactory operation in some instances. In one example, in the event of loss of power supplied to the valve, such as by a dead battery, the valve would close, potentially causing damage to the engine. As these vehicles are often operated very far from assistance, such damage to the engine could be catastrophic to the rider. By utilizing a normally open valve, this potential for damage is eliminated as the valve will remain open when power is lost to the valve.

Figure 4:
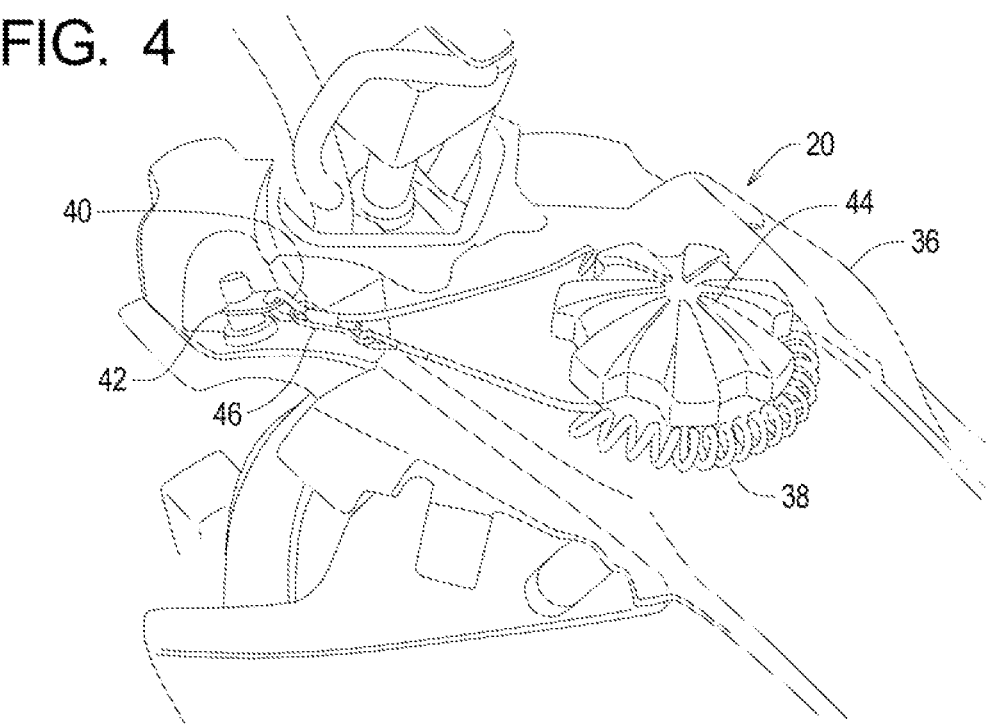
FIG. 4 is a drawing of a tether attached to a vehicle, in one form.

FIG. 4 shows one embodiment of the oil shut off system 20 being utilized on a snowmobile 36, although, as previously discussed, the system 20 could equally be utilized on other vehicles. As shown, the cowling of the snowmobile has been removed so that the front part of the engine compartment can be easily seen. The tether 38 is shown having a first end 40 coupled to the tether control switch 42. The tether 38 is shown in a common stowed position wherein it is wrapped around the gas cap 44 and back to the tether coupling 46. In normal operation, the tether coupling 46 would be attached to the driver, such that when the driver is not in a position to properly control the vehicle, such as being removed therefrom, the tether switch 42 is activated shutting off the vehicle. As previously discussed, in one example: when the tether switch 42 is activated the solenoid control valve 22 will close thus keeping oil from leaking out through the oil line vent 30. When the vehicle is returned to an upright position, the tether 38 may be reattached to the tether switch 42, opening the valve 22, allowing tank vapors to circulate through the system, such that the vehicle 36 can be restarted.

Figure 3:
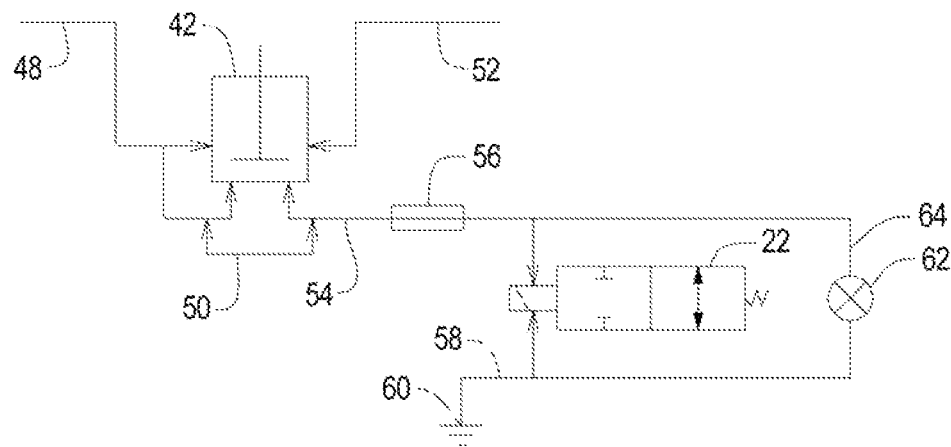
FIG. 3 is a schematic diagram of the electric connections in an oil line solenoid valve shutoff system, in one form.
Figure 5:
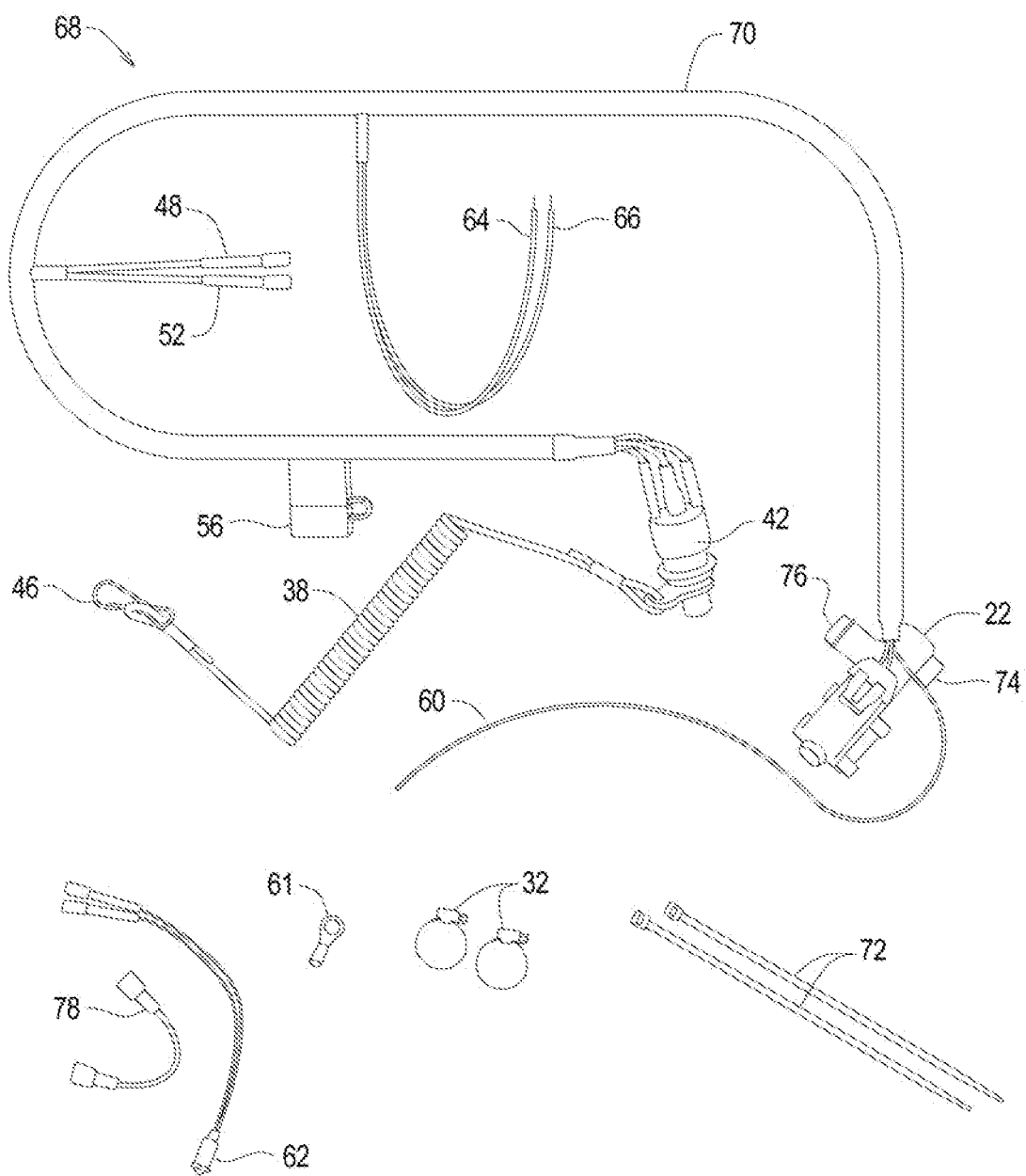
FIG. 5 is a drawing of a retrofit kit for an oil line solenoid valve shutoff system, in one form.

The schematic diagram shown in FIG. 3 shows one embodiment for interconnecting the individual components to achieve the desired outcome. In one form, the tether switch 42 is wired in series with the factory mounted handlebar kill switch. The tether switch 42 is shown coupled to the "hot side" 48 of a kill switch wire which may lead to the ignition switch of the vehicle. In one form, a double pole single throw switch is utilized for the tether switch 42. The output side of the tether switch 42 in one form is coupled to leads 52 and 54. The lead 52 couples to the power input source (cold side) of the vehicle kill switch (in one form the vehicle handlebar OEM kill switch), and the lead 54 is coupled to the input side of the electric solenoid valve 22, in one form, through a fuse 56. In one form, a three-amp, in-line fuse can be utilized. In one form, the output lead 58 from the solenoid control valve 22 connects to the ground at a grounding plug 60. The lead 58, or grounding wire, is also shown in FIG. 2. In one form, it may be desired to have an audio or visual signal to indicate the status of the solenoid control valve 22. In one form, as shown in FIGS. 3 and 5, a light or light emitting diode (LED) 62 can be included and connected by way of leads 64 and 66 to illuminate when power is supplied to the solenoid control valve 22 and indicate that the valve is in the closed position.

Figure 6:
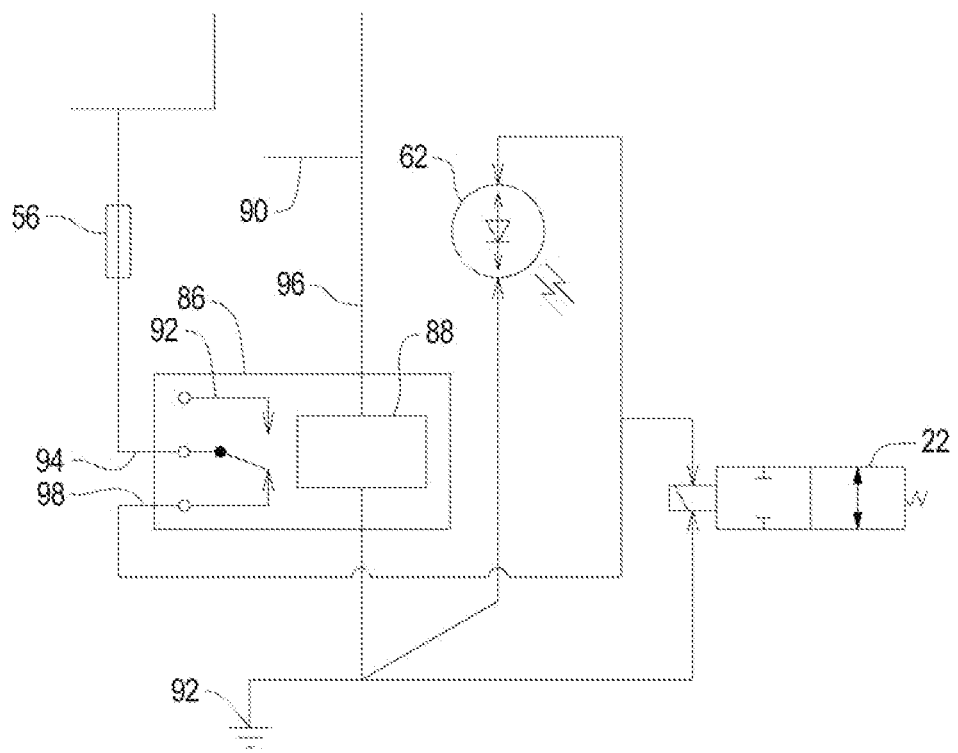
FIG. 6 is a schematic diagram of the electric connections in an oil line solenoid valve shutoff system, in one form.

In another embodiment, shown in FIG. 6, a control relay 86 is used instead of the double pole tether switch 42 previously described. In this embodiment, the coil of the control relay 86 is electrically coupled between the fuel pump/ignition/ECU (engine control unit) wire 90 and ground 92 by way of a lead wire. Thus, when power is supplied to the fuel pump, the relay coil 88 is energized, and the normally open terminal 95 is closed to the common terminal 94. To engage the disclosed rollover valve, the user engages the kill switch while leaving the key in the on position; this stops the engine and power is cut from the fuel pump/ignition/ECU, the relay coil 88 is not energized, and the normally closed terminal 98 is closed to the common terminal 94. Alternatively to connecting to the fuel pump power supply/ignition/ECU, the relay coil 88 could alternatively be coupled to a standard handlebar kill switch. As the normally closed terminal 98 is coupled to the normally open solenoid valve 22, power to the normally closed terminal 98 would close the solenoid 22, which is fluidically coupled as described above. A fuse 56 may be interposed between the power supply line 102 and the common terminal 94. In one form, the power supply line 102 is coupled to the ignition switch such as to have power supplied only when the ignition key is on.

In another form, the leads 102 and 90 are connected to the terminals of a normally closed type tether switch. During engine operation the tether switch contacts are closed, allowing the engine to run and supplying power to the relay coil 88. This energizes the relay coil 88, and closes the circuit between the common terminals 94 and 95. Thus power is not supplied to the terminal 98, nor to the solenoid valve 22. This allows the valve to remain open and vent the oil tank.

When the tether is pulled, the contacts on the tether switch open, stopping the engine and cutting power to the relay coil 88. This allows the contacts to close between terminals 94 and 98, which in turn supplies power to the solenoid valve 22, closing the solenoid valve 22. This allows for operation of the solenoid valve 22 even when the ignition key is in the on position during the rollover event.

In one form, as shown in FIG. 6, an indicator 62, as previously described, can be utilized to indicate to a driver that the solenoid valve 22 is closed, and that the vehicle should not be started.

Looking to FIG. 5 a retrofit kit 68, is shown in one form. The kit is utilized for converting a vehicle, such as a snowmobile, to utilize the disclosed solenoid valve. The kit 68 in one form comprises a wiring harness 70. The wiring harness 70 connects the solenoid control valve 22 to the tether switch 42 and also comprises leads 48 and 52, which may be coupled to an existing kill switch. The wiring harness 70 also comprises the leads 64 and 66, which may be coupled to the LED indicator 62 if utilized. The ground wire 60 is also shown, as well as a grounding terminal 61, which would couple the grounding wire 60 to the vehicle such as at the frame. The in-line fuse 56 is also provided as a portion of the wiring harness 70. A tether 38 and a tether coupling 46 are also shown. In normal operation, the tether coupling 46 is attached to the user so as to pull upon the tether 38 when the user is removed from the vehicle. The jumper wire 78 can be utilized as an emergency device in case of losing the tether, or in failure of the tether switch 42. If the tether switch 42 fails, the tether switch can be "jumped" with the jumper wire 78 to re-open the solenoid valve 22. To utilize the jumper wire 78 in case of failure of the tether switch, the tether switch may first be disconnected from the wiring harness and then wire 48 could be jumped to wire 52, bypassing the tether switch. The jumper wire 78 could also be used in a similar manner in the event of failure of the kill switch. A plurality of zip ties 72 or similar attachment devices may also be included, as well as a plurality of hose clamps 32, to couple the fluid input 74 and fluid output 76 of the solenoid control valve 22, as previously discussed.

A wireless tether could also be utilized. Such wireless tethers are becoming better known, and they generally activate the tether switch when the user wearing the transmitting portion becomes removed from the vehicle. A manual reset is often utilized in such a system, such that the ignition and oil line valve will not automatically become active when the user returns to the vehicle. This is important, as the vehicle may not be in an upright position or may be otherwise unusable.

Figure 7:
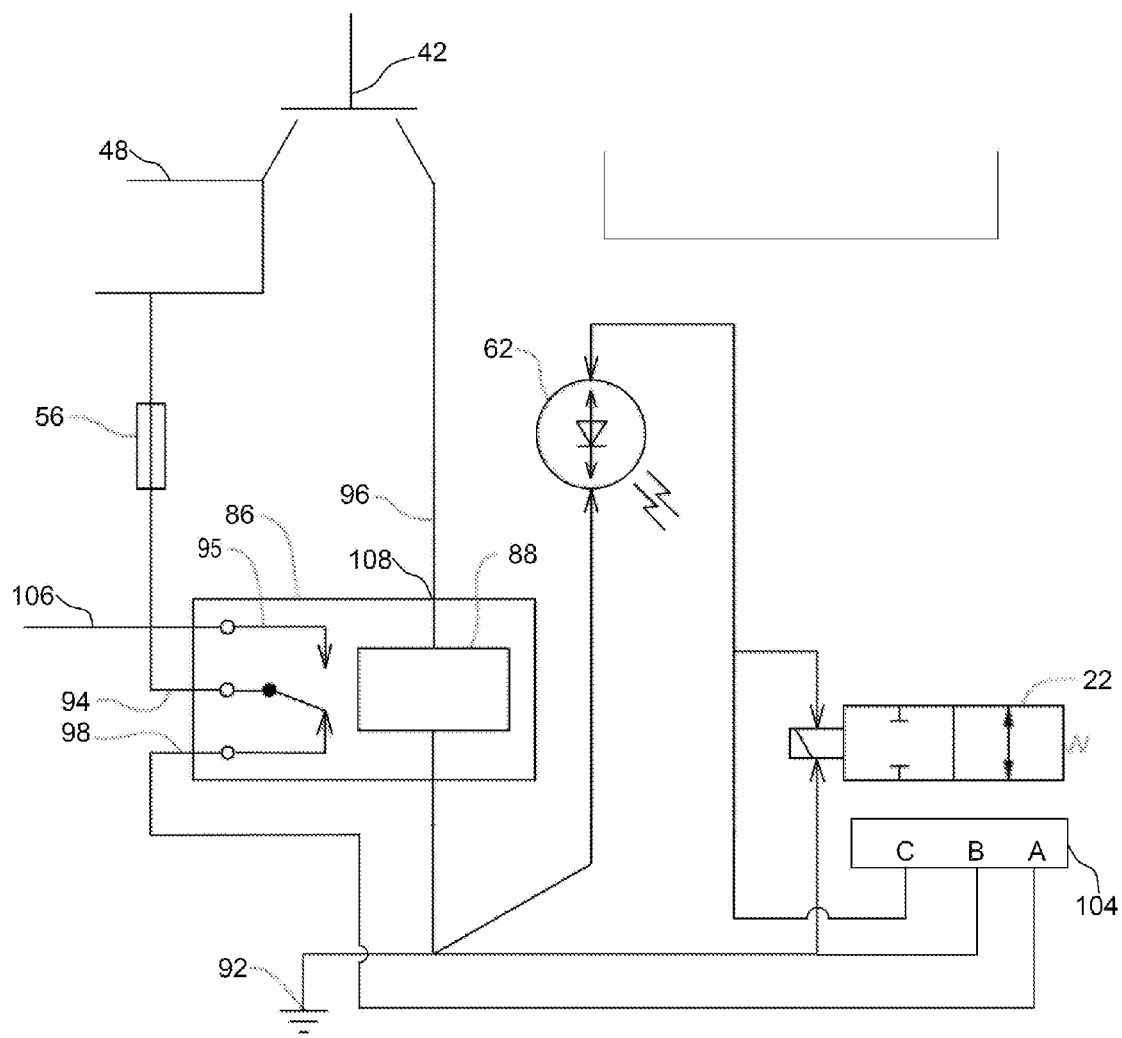
FIG. 7 is a schematic diagram of the electric connections in an oil line solenoid valve shutoff system utilizing a control module, in one form.

An improvement is disclosed further comprising an electronic control module (ECM) circuit or rollover valve control module (ROVCM) 104 shown in FIG. 7. The ECM/ROVCM has inputs A-B-C which may be electrically connected to the system as shown, or when desired the module may be detached and a jumper wire 78 may be utilized across the wires attaching to terminals A-C to "bypass" the module during a fault situation. In one form, the module 104 comprises a programmable output voltage, input voltage monitoring and internal timer settings. It has been found that in many applications, the solenoid valve 22 does not require the same voltage to maintain the valve in a certain position, as it requires to open or close the valve. Thus, the module 104 may provide output voltage to the solenoid valve 22 in one example as a pulse width modulated output signal to the optional LED 62 and to the electric solenoid valve. When the tether switch 42 opens for example due to removal of the tether 38, the control relay 86 closes relative to terminal 98. Power is then provided to the module 104 which energizes terminal C and activates the optional LED 62 and causes the shut-off solenoid valve 22 to close. Power from the module may be provided as a pulse width voltage, which also in some examples allows for a higher voltage output than input to the module as a non-pulsed voltage. After the valve is closed, for example after a short time interval which may be programmed into the module 104, power may be provided from the module 104 to the solenoid valve 22 and to the optional LED 62 as a different wave form, or lower voltage to reduce draw on the battery until the system is reset.

In one example, when the engine is running, the tether switch 42 contacts are closed between the hot side 48 and the lead 96. This allows ignition voltage to be applied to relay terminal 108. This closes the relay contacts between terminal 94 and 95. Voltage is then allowed to supply power to the ignition system, engine control module, handlebar kill switch or fuel pump relay in one form via wire 106. This in turn allows the engine to operate.

As briefly mentioned above, the ECM/ROVCM in one example is programmable so that output voltage can vary depending on if the shut-off valve is closing remaining in a closed state. This allows for a higher voltage to rapidly close the valve and a lower voltage to save on battery power once the valve is closed. The ECM/ROVCM in one example also has a battery voltage monitoring feature. This battery monitoring feature allows the shut-off valve to remain closed for a specific amount of time and automatically shut down the system if the vehicle's batter voltage drops to a pre-programmed setting.

In one example, the module 104 monitors the input voltage in such a way that when a lower limit threshold voltage is reached, say for example below 10V in a 12V system or below 5V in a 6 volt system, the module 104 will shut off. The battery type also effect this, for example testing has shown an effective lower threshold for a lead acid battery may be 12.1V and a lower threshold for a Lithium Ion battery may be 13.2V. This battery monitoring prevents the system from drawing down power below the threshold at which the battery does not have enough power (as determined for example by the battery voltage) to re-start the engine of the vehicle. It is conceived that a user may leave a vehicle unattended with the ignition on, and the tether removed. While this situation will stop the engine from running, the user may be unaware that power (current) is being drawn from the system to maintain the valve 22 in the closed position. If an LED or other indicator is used, the indicator may also be reducing the power available in the battery.

If it is desirable not to have an ECM/ROVCM in the system, the ECM/ROVCM may be replaced by a simple jumper wire connection 78, that connects terminals "A" and "C" of the module 104.

By providing power to the fuel pump/ignition/ECU via lead 106, the engine is generally prohibited from operating while the solenoid valve 22 is closed which could cause catastrophic damage to the engine.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. An oil shutoff system in a vehicle having an engine; the oil shutoff system comprising:
   a. a control valve having a valve inlet, a valve outlet, and a valve actuator;
   b. the control valve coupled in an oil line between an oil system of the vehicle, and atmosphere so as to close the oil line when the control valve is in a closed position;
   c. wherein the control valve is a normally open control valve;
   d. wherein the valve actuator is an electrically actuated solenoid;
   e. wherein the valve actuator is configured to hold the control valve open until a tether switch is actuated;
   f. the control valve inlet configured to be fluidly coupled to an engine oil tank via an oil passageway;
   g. the control valve outlet configured to be fluidly coupled to atmosphere; and
   h. wherein the valve actuator is configured to be electrically coupled to the tether switch, so as to close the control valve when the tether switch is opened to close the oil passageway.

2. The oil shutoff system as recited in claim 1 wherein the control valve outlet is configured to be fluidly coupled to atmosphere through an engine air intake.

3. The oil shutoff system as recited in claim 1 further comprising an electronics module electrically coupled between a relay and the valve actuator to provide voltage and/or current to the valve actuator at a state altered from a battery output.

4. The oil shutoff system as recited in claim 3 wherein the voltage applied from the electronics module is provided at a pulse width modulated voltage.

5. The oil shutoff system as recited in claim 1 further comprising:
   a. an electronics module electrically coupled between a relay and the valve actuator;
   b. wherein the electronics module comprises a timer which shuts off power to the valve actuator after a programmed time interval.

6. The oil shutoff system as recited in claim 5 wherein the timer further shuts off power to a shutoff system indicator after a programmed time interval.

7. The oil shutoff system as recited in claim 1 wherein the valve actuator is electrically coupled to the engine, so as to close the control valve when the engine is not in operation.

8. The oil shutoff system as recited in claim 1 wherein the valve actuator is normally open and remains open until a tether switch is actuated.

9. An oil shutoff system in a vehicle having an engine; the oil shutoff system comprising:
   a. a control valve having a valve inlet, a valve outlet, and a valve actuator;
   b. the valve inlet fluidly coupled to an engine oil tank;
   c. the valve outlet fluidly coupled to atmosphere;
   d. wherein the valve actuator is configured to remain open while power is provided to a fuel pump;
   e. a relay comprising a common electrical connection coupled to an ignition switch;
   f. the relay comprising a normally closed electrical connection coupled to the valve actuator, and;
   g. the relay comprising a relay coil electrical connection magnetically coupled to the common electrical connection and electrically coupled to the fuel pump.

10. The oil shutoff system as recited in claim 9 further comprising an electronics module electrically coupled between the relay and the valve actuator to provide voltage and/or current to the valve actuator at a state altered from a battery output.

11. The oil shutoff system as recited in claim 10 wherein the voltage applied from the electronics module is provided at a pulse width modulated voltage.

12. The oil shutoff system as recited in claim 9 further comprising:
   a. an electronics module electrically coupled between the relay and the valve actuator;
   b. wherein the electronics module comprises a timer which shuts off power to the valve actuator after a programmed time interval.

13. The oil shutoff system as recited in claim 12 wherein the timer controls power to a shutoff system indicator.

14. The oil shutoff system as recited in claim 13 wherein the indicator is a light emitting diode.

15. The oil shutoff system as recited in claim 9 further comprising a normally closed single pole tether switch.

16. The oil shutoff system as recited in claim 9 further comprising:
   a. an electronics module electrically coupled between a relay and the valve actuator; and
   b. a jumper wire configured to be attached to the electronics module in the event of failure of the electronics module.

17. The oil shutoff system as recited in claim 9 further comprising an audio or visual signal configured to indicate when the control valve is in the closed position.

* * * * *